United States Patent [19]

Takamoto et al.

[11] Patent Number: 5,115,392
[45] Date of Patent: May 19, 1992

[54] METHOD AND APPARATUS FOR MULTI-TRANSACTION BATCH PROCESSING

[75] Inventors: Yoshifumi Takamoto, Hachioji; Shunichi Torii, Musashino, both of Japan

[73] Assignee: Hitachi, Ltd., Tokyo, Japan

[21] Appl. No.: 106,062

[22] Filed: Oct. 7, 1987

[30] Foreign Application Priority Data

Oct. 9, 1986 [JP] Japan .................. 61-239009

[51] Int. Cl.$^5$ .................. G06F 15/16; G06F 3/02
[52] U.S. Cl. .................. 395/650; 364/260.0; 364/260.2; 364/260.3; 364/260.5; 364/DIG. 1
[58] Field of Search .................. 364/200, 900, 300

[56] References Cited

U.S. PATENT DOCUMENTS

| | | | |
|---|---|---|---|
| 4,107,784 | 8/1978 | Van Bemmelon | 364/900 |
| 4,274,139 | 6/1981 | Hodgkinson et al. | 364/200 |
| 4,302,810 | 11/1981 | Bouricius et al. | 364/200 |
| 4,441,163 | 4/1984 | Liekam et al. | 364/900 |
| 4,714,995 | 12/1987 | Materna et al. | 364/200 |
| 4,724,521 | 2/1988 | Carron et al. | 364/300 |

*Primary Examiner*—Raulfe B. Zache
*Assistant Examiner*—Glenn Richman
*Attorney, Agent, or Firm*—Fay, Sharpe, Beall, Fagan, Minnich & McKee

[57] ABSTRACT

In a data communication management system, a first transaction causes an application program to start. When a transaction arises, it is determined whether the transaction is to be batch processed as one of a plurality of transactions. Batch processing is determined based on the name of the transaction and the name of a application program requested. If it is determined that the transaction should not be batch processed, the transaction undergoes ordinary processing. If it is determined that the transaction is to be batch processed, the transaction is stored in a batch process queue. The application program for all transactions stored in the batch process queue is started when the number of transactions stored in the queue has exceeded a certain number or when a predetermined time length has elapsed after any transaction has been stored in the queue. After the application program is terminated, a batch synchronous point process is carried out for all the transactions. The transmission messages are then transmitted in batch fashion.

13 Claims, 9 Drawing Sheets

STRUCTURE OF TRANSACTION

EDITED INPUT MESSAGE FORMAT

BATCH TRANSACTION TABLE

| BATCH TRANSACTION NAME ~301 | MAX. WAIT TIME ~302 | MAX. NUMBER OF BATCH TRANSAC-TIONS ~303 | QUEUING START TIME ~304 | NUMBER OF BATCH TRANSAC-TIONS ~305 | QUEUING STATUS ~306 |
|---|---|---|---|---|---|
| TRNS 1 | 200 | 100 | 0 | 0 | N |
| TRNS 2 | 300 | 200 | 25300 | 30 | Q |
| TRNS 3 | 250 | 100 | 42150 | 100 | F |
|  |  |  |  |  |  |

BATCH TRANSACTION NAME SYSTEM MESSAGE RECEPTION QUEUE FORMAT

APPLICATION PROGRAM CORRESPONDENCE TABLE

| TRANSACTION NAME | APPLICATION PROGRAM NAME |
|---|---|
| TRNS 1 | AP 1 |
| TRNS 2 | AP 2 |
| TRNS 3 | AP 3 |

METHOD AND APPARATUS FOR MULTI-TRANSACTION BATCH PROCESSING

BACKGROUND OF THE INVENTION

This invention relates to a method and apparatus for a transaction process in which transactions are processed at high speed.

In a conventional transaction process system, the data communication management system sends a transaction, which has been entered through a terminal, to a user application program (UAP), as described in publication "HITAC Manual Program Product VOS3, Data Communication Management System DCCM3 Guidance" pp. 18-21. At this time, the data communication management system implements the UAP start-up process including the reservation of resources used by the UAP for processing and the initialization of the data base management system. After this process, the UAP is initiated to carry out a job process based on the transaction entered through the terminal. Upon completion of the UAP process, control is transferred to the data communication management system, by which a synchronous point process is implemented. The synchronous point process includes the acquisition of the journal for the sake of recovery of the contents of data base operated in the UAP in the event of a failure. After the synchronous point process has been completed, the system transmits the transmission message, which the UAP has produced during the job process, to the terminal. In this manner, the data communication management system has conventionally implemented the process of one transaction in a single control session for the same UAP.

In the foregoing conventional system, the data communication management system has only been able to implement one transaction process in one control session for the same UAP. Accordingly, if a plurality of transaction process requests arise to the same UAP, the data communication management system needs to implement the UAP control as many times as there are requests. The UAP start-up process contains many processes common to the transactions and expends much time due to frequent file input/output operations. The UAP termination process contains many processes common to transactions, and includes the synochronous point process. Both start up and termination processes must be implemented as many number of times as requests. This results in inefficiency of control.

SUMMARY OF THE INVENTION

An object of this invention is to provide a method and apparatus for a transaction process capable of efficient and fast transaction processing by eliminating the UAP start-up and termination processes when processing a plurality of transactions.

According to this invention, when a transaction requiring an application program has arisen, it is determined whether the transaction is to be batch processed in accordance with the application program requested by the transaction. In the case of a batch process, the transaction is set in the batch process transaction queue. For transactions set in the queue, the application program is initiated once to process all the transactions after a certain number of transactions have been set in the queue or upon expiration of a certain time length after a specific transaction has been set in the queue. After the application program has terminated, a batch synchronous point process is carried out for all the transactions.

The data communication management system to which this invention is applied includes (1) a batch transaction determination section which determines whether each arising transaction is to be batch processed (2), a batch transaction reception section which sets batch processed transactions in respective queues. (3) a batch synchronous point acquisition section which implements the synchronous point process for all transactions in response to a single synchronous point acquisition request, and (4) a batch message transmission section which can transmit output messages of transactions in a single session.

The batch transaction determination section determines whether the transaction sent from a terminal is a transaction to be batch processed. If the transaction is found to be one that should not be batch processed, it undergoes the ordinary transaction process. If the transaction is found to be one that should be batch processed, it is controlled by the batch reception section. The batch transaction determination section bases the batch or non-batch discrimination on the application program requested by the transaction. For example, the name of transaction corresponding to the application program determines whether or not the transaction is to be batch processed. The dependency of transactions to be batch processed on application programs is determined by the user in advance.

When a transaction to be batch processed is entered from a terminal, it is checked for batch processing or not. Control of the transaction is transferred to the transaction reception section. In the case of a batch processed transaction, it is placed in one of queues provided separately for groups of batch processed transactions. The batch transaction reception section also controls the queues. It passes control to the program for initiating a UAP when the number of queued transactions has exceeded a predetermined threshold or when the wait time in receiving a specific transaction has expired. This allows the UAP start-up process to be carried out once for a plurality of transactions, whereas, conventionally, it has been carried out a plurality of times for individual transactions.

The batch synchronous point processing section operates in response to the synchronous point batch process request raised at the end of the UAP process for the batch processed transactions and implements the synchronous point process for the batch processed transactions. As a consequence, processes common to several transactions such as the UAP resource releasing process during the synchronous point process are required only once for a plurality of transactions, whereas conventionally, they have needed to run a plurality of times for individual transactions. The batch synchronous point process allows transactions to have batch acquisition of the journal for recovering the contents of a data base. The process also allows output to a file at the occurrence of a failure, resulting in the reduction of the file output process as compared with the case of the conventional individual processes.

The batch message transmission section sends output messages of transactions to the terminals at one time, whereby processes preceding and following the message transmission for output messages are reduced to a single occurrence.

The application program initiation and termination processes include many processes common to the transactions and expend much time for file input/output. According to the present invention, when a plurality of transaction process requests have arisen for the same application program, the application program initiation and termination processes are allowed to take place only once for the transactions. This process is accompanied by other processings such as the synchronous point process, whereby the transaction process time can be reduced.

The batch processing system of the present invention, in which a similar process is repeated for a plurality of transactions by starting an application program only once, is suitable for vector processing. It becomes possible to speed up the hardware-based process through the use of the processing apparatus as a vector computer.

BRIEF DESCRIPTION OF THE DRAWINGS

These and other objects and advantages of the present invention will become more apparent from the following description and accompanying drawings wherein.

DESCRIPTION OF THE PREFERRED EMBODIMENT

Figure 1:
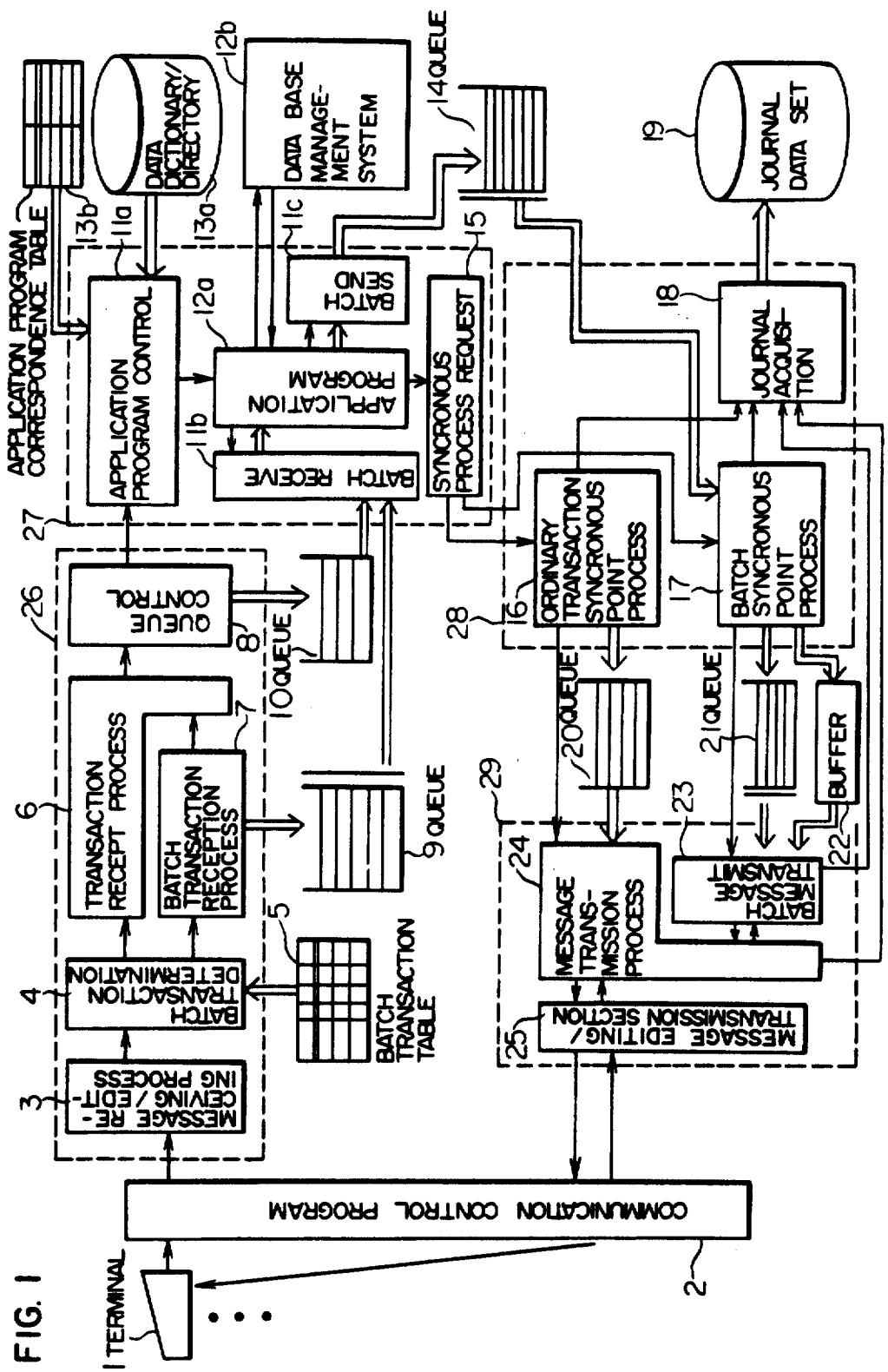
FIG. 1 is a block diagram of the system embodying the transaction processing of the present invention.

An embodiment of this invention will now be described with reference to the drawings. FIG. 1 shows the overall arrangement of an embodiment of this invention. First, the global system structure will be described. The whole system is divided into a processing unit and a group of terminals. A terminal 1 belongs to the terminal group, while other functional blocks belong to the processing unit. The terminal 1 is operated by the user for online processing and also used for sending and receiving messages. A communication control program 2 implements the message transfer between the processing unit and terminal 1. Constituents of the data communication management system 26, 27 28 and 29 function as a message reception section, application program execution section, synchronous point processing section, and message transmission section, respectively. The message reception section 26 consists of a message receiving-editing section 3, a batch transaction determination section 4, a transaction receiving-processing section 6, a batch transaction receiving section 7, and a queue control section 8. Among these functional blocks, the batch transaction determination section 4, batch transaction receiving section and queue control section 8 are used for operating a batch transaction table 5, batch message queue 9 and system message reception queue 10, respectively.

The application program execution section 27 consists of an application program control section 11a, an application program 12a, a batch receive section 11b, a batch send section 11c, and a synchronous point process request section 15. Element 13b is an application program correspondence table. Element 13a is a data dictionary/directory file used by the application program control section. Element 14 is a batch transmission message queue used by the batch send section. Element 12b is a data base management system invoked by the application program 12a.

The synchronous point processing section 28 consists of an ordinary transaction synchronous point processing section 16, a batch synchronous point processing section 17, and a journal acquisition section 18. Element 19 is a journal data set used by the journal acquisition section 18. Element 20 is a system message wait queue used by the ordinary transaction synchronous processing section. Element 21 is a batch message wait queue. Element 22 is a batch message wait queue status buffer used by the batch synchronous point processing section 17.

The message transmission section 29 consists of a message transmission processing section 24, a batch message transmission section 23, and a message editing-transmission section 25.

Next, the operation of individual components will be described, starting with the message reception section 26. A message sent from the terminal 1 is received by the message receiving-editing section 3 through the communication control program 2. Receiving the message sent from the terminal 1, the message receiving-editing section 3 edits it. The term "edit" used here means to convert the data format specific to a terminal to the data format which can readily be read by the program. Following the editing process, control is transferred to the batch transaction determination section, which then determines whether the transaction is to be batch processed.

Figure 2:
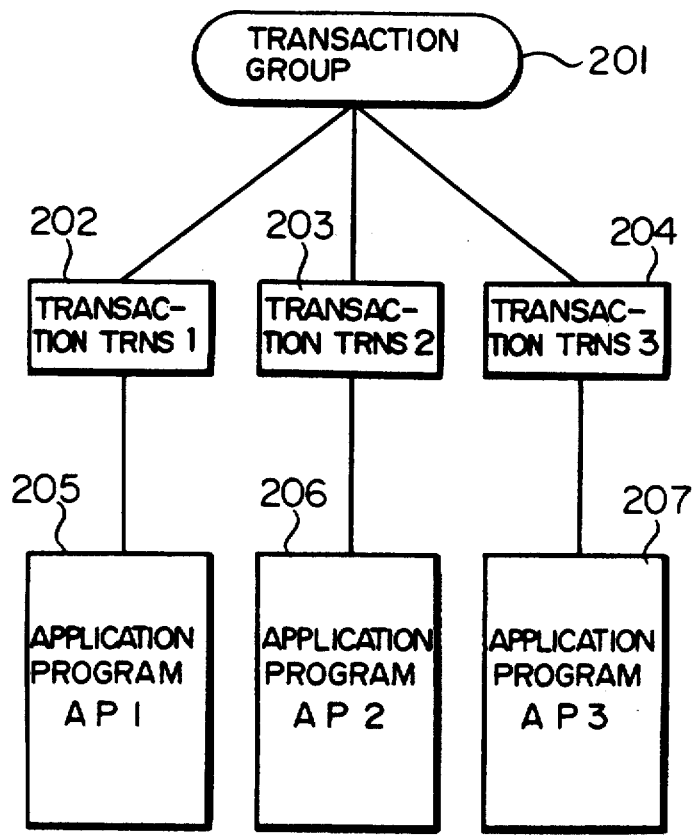
FIG. 2 is a diagram showing transactions.

The batch process of this embodiment will be described with reference to FIG. 2 showing the structure of transaction. In the figure, 201 is a transaction group which is a set of transactions 202, 203 and 204. Application programs 205, 206 and 207 are executed in correspondence to the transactions 202, 203 and 204, as shown. The transaction group, transactions and application programs have a transaction group name, transaction names and application program names, respectively. In this example, the transactions 202, 203 and 204 are named TRNS1, TRANS2 and TRANS3, and the application programs 205, 206 and 207 are named AP1, AP2 and AP3. Once the name of a transaction to be executed is determined, the application program which executes the transaction is determined uniquely. As a consequence, the transaction name is rendered representative of the object of batch process. Namely, although the application program invoked by a transaction determines whether the transaction is batch processed, the application program is determined uniquely from the transaction name. The transaction determines batch processing based on the transaction name.

Figure 3:
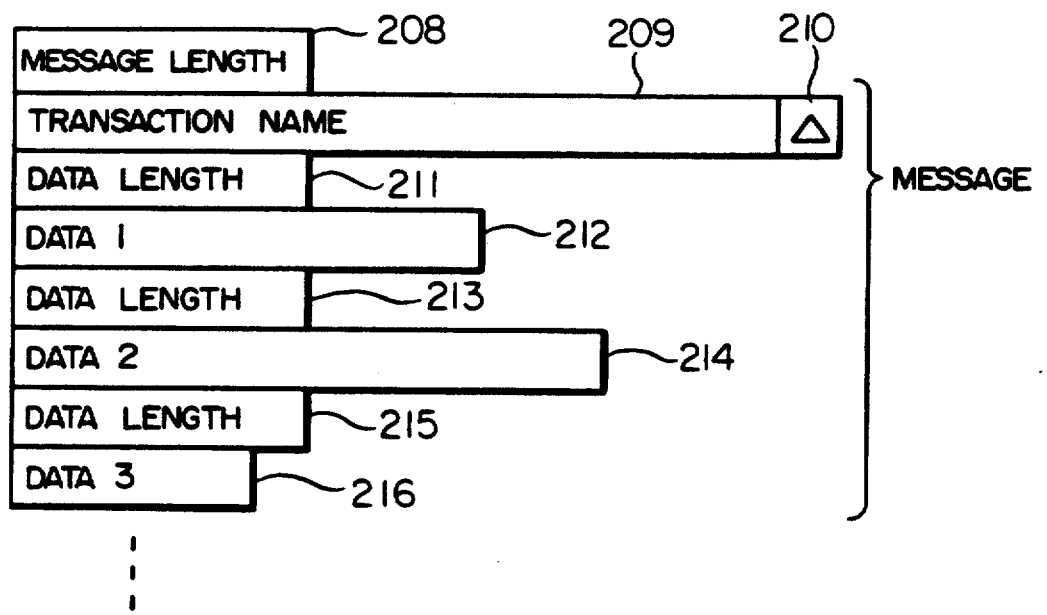
FIG. 3 is a diagram showing the format of edited input messages.
Figures 4, 5:
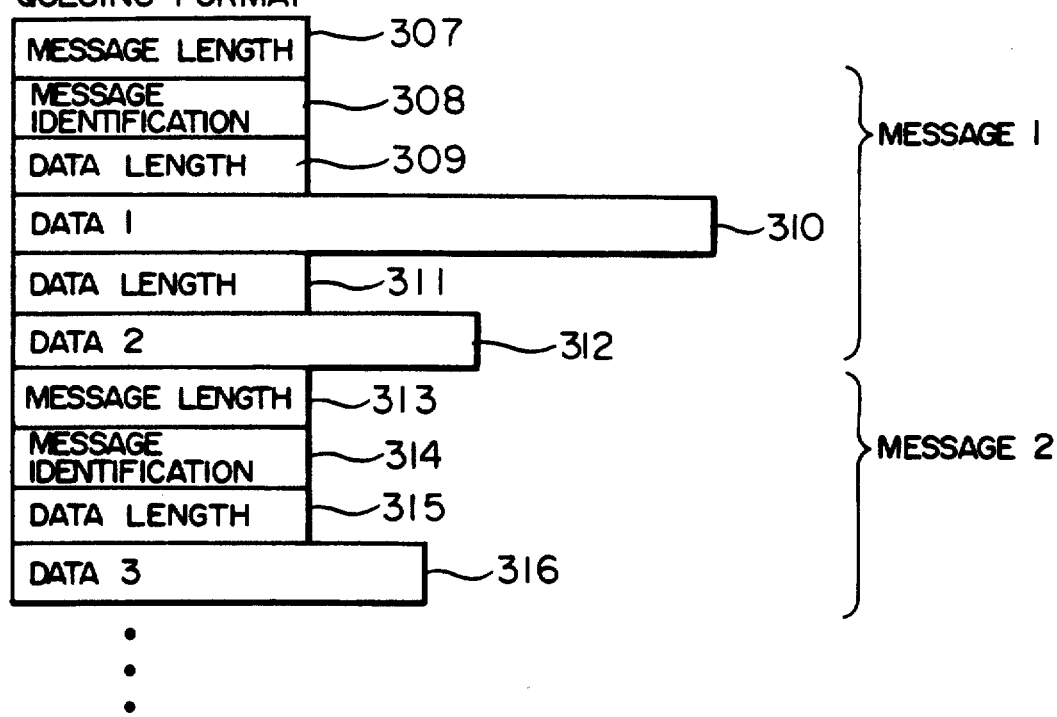
FIG. 4 is a batch transaction table.
FIG. 5 is a diagram showing the format of the batch message queue.

The transaction name is included in the message sent from a terminal, as shown FIG. 3. FIG. 3 shows the edited input message format, indicated by element 208 is the message length, element 209 is the transaction name, element 212 is data used in the execution of the application program corresponding to the transaction name, element 211 is the data length, and elements 213-216 are other sets of data length and data. A space symbol 210 is used to extract the transaction name from the message. As to whether the extracted transaction name is pertinent to a transaction to be batch processed is determined by making reference to a batch transaction table 5 shown in FIG. 4. In the figure, 301 is a column for storing transaction names pertinent to batch processing, 302 is a column for storing maximum wait times, i.e., limited time lengths in which respective transactions can be held, and 303 is a column for storing the maximum number of transactions to be batch processed. Columns 304, 305 and 306 store the status of the batch message queue 9. Reference numeral 304 indicates the time when message storing in the batch message queue has begun, 305 indicates the number of messages stored in the batch message queue. Reference numeral 306 indicates the queuing status of the message. The batch transaction determination section 4 goes on processing by using the edited input message shown in FIG. 3 and the batch transaction table 5 shown in FIG. 4.

Figure 8:
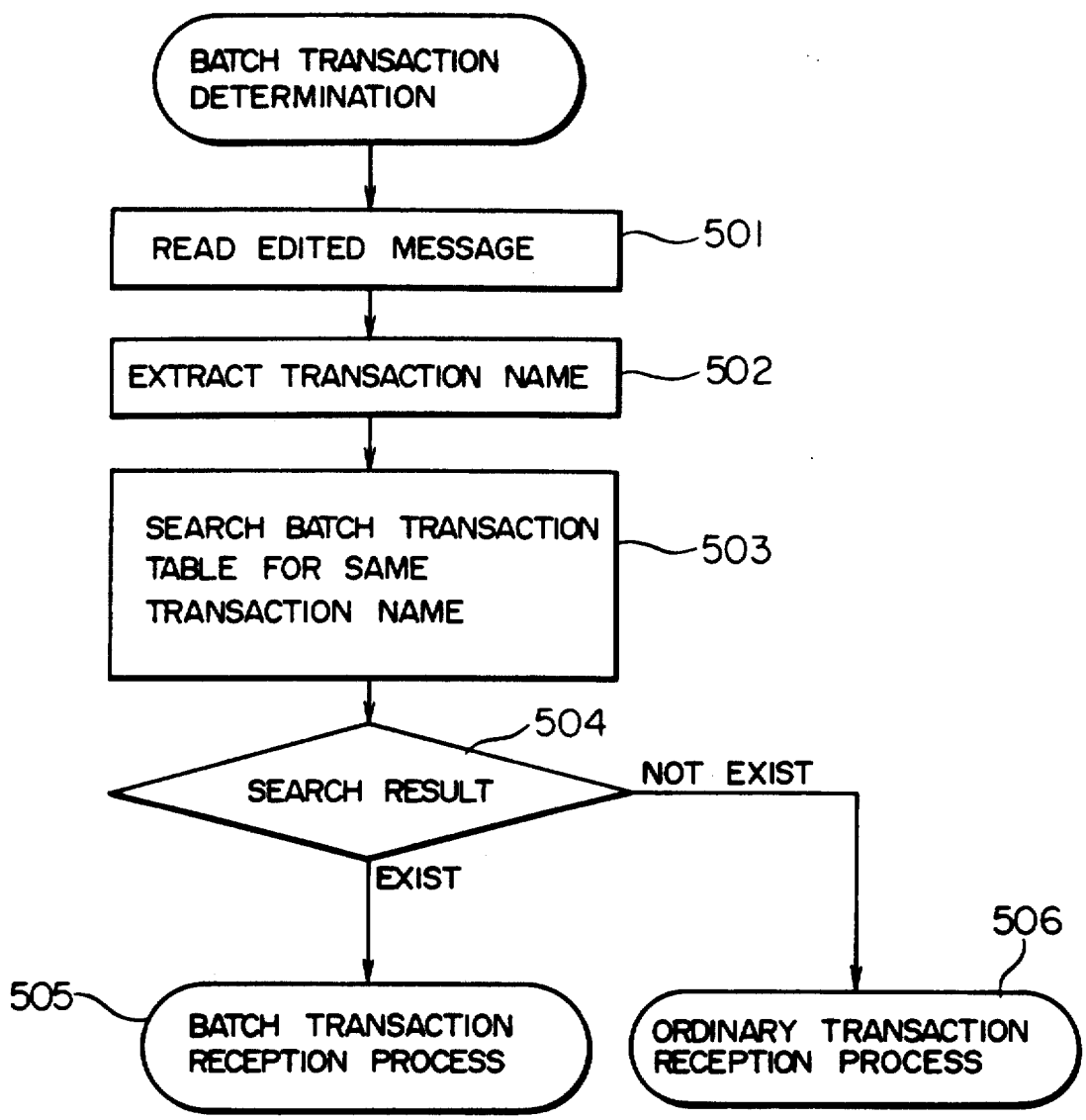
FIG. 8 is a flowchart of the batch transaction determination process.

FIG. 8 shows the operation of the batch transaction determination section. Step 501 receives an edited message from the message receiving-editing section 3. Step 502 extracts the transaction name from the received message. Step 503 searches the batch transaction name column of the batch transaction table for the extracted transaction name. Step 504 transfers control to the batch transaction reception section 7 if the transaction name is found in the table, or to the transaction reception processing section 6 if it is not found. The transaction reception processing section 6 is used to implement the reception process for ordinary transactions. It sends the transaction to the queue control section 8. The batch transaction reception section 7 is used to queue batch transactions.

Figure 9:
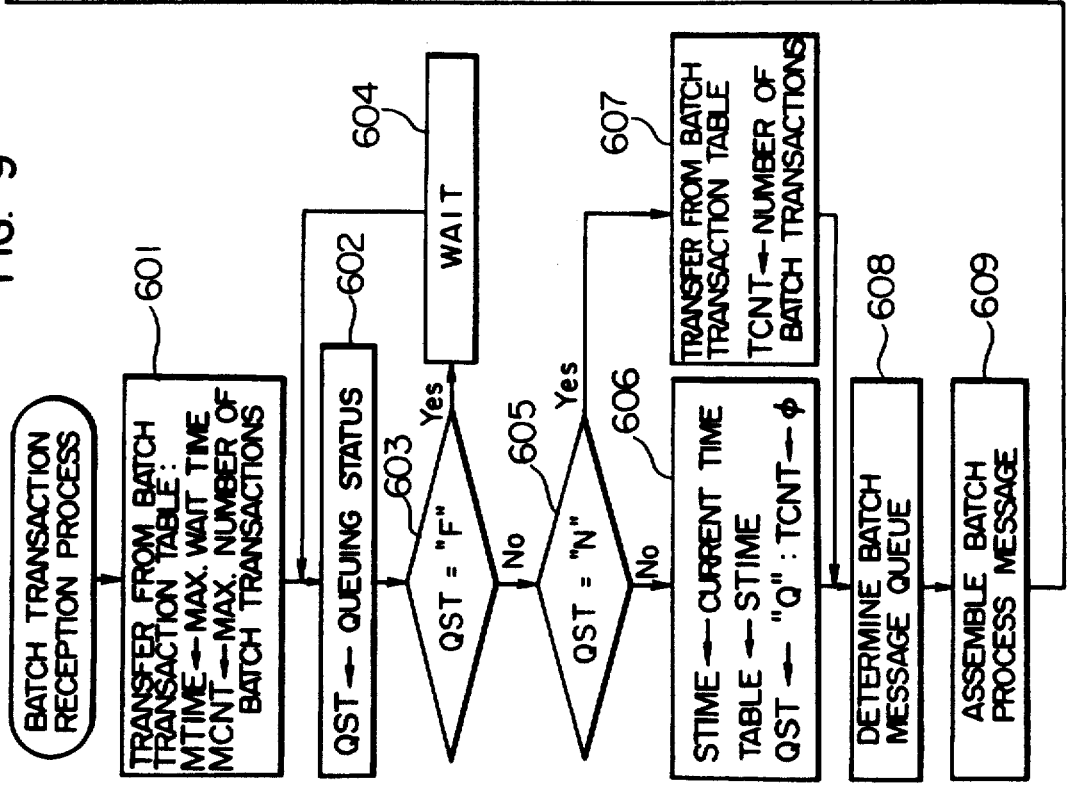
FIG. 9 is a flowchart of the batch transaction reception process.

The operation of the batch transaction reception section will be described with reference to FIG. 9. Step 601 loads the maximum wait time into MTIME and the maximum number of batch transactions into MCNT from the batch transaction table at the row of terminal-input transaction name. Step 602 loads the queuing status into QST from the batch transaction table in the same way as step 601. Decision step 603 of QST="F" tests whether the queue is currently full. If it is found full (yes), the step tests the queuing status again on expiration of a certain time length, and the sequence proceeds to step 605 in response to a non-full (no) result. The step 605 tests whether the batch transaction queue is empty (no) or it stores a message currently (yes). In case of a "no" result, the queuing status of the batch transaction table is set to "Q", indicative of the commencement of queuing. The current time of the clock is stored in STIME. The STIME content is stored in the column of the queuing start time of the batch transaction table, and $\phi$ is stored in TCNT for indicating the number of transactions stored in the batch message queue.

Step 607 takes place when messages are stored in the batch message queue. It loads the number of batch transactions stored currently in the queue into TCNT. Step 608 determines a batch message queue from the transaction name for storing the message. A batch message queue is assigned to each transaction name. Step 609 is used to form a message which is stored in the batch message queue, with its message format shown in FIG. 5. In the figure, 307 is the length of a message, and 308 is a field which normally contains the transaction name. The transaction name is not necessary because the batch message queue is native to the transaction name. So, it actually contains the message identification for distinguishing messages within the same batch message queue. Field 310 is used for data possessed by each transaction. The data length is indicated by field 309. Fields 311 and 312 are another set of data length and data. Fields 308-312 are for one message, and fields 313-316 are for the next message. The format is common to all messages.

Figures 6, 7:
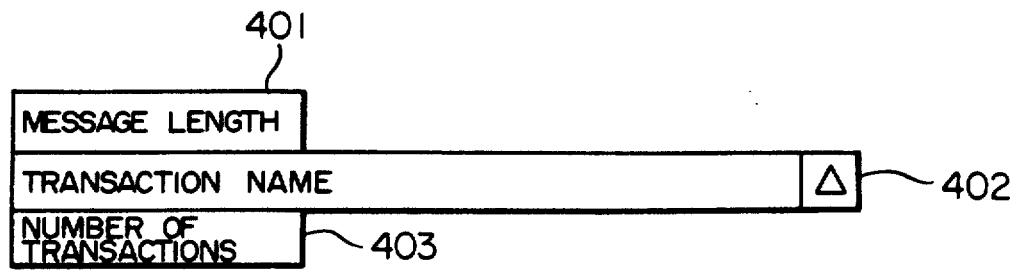
FIG. 6 is a diagram showing the format of the batch transaction name and system message reception queue.
FIG. 7 is an application program correspondence table.

Following the message assembling in step 609, step 610 stores the message in the batch message queue. Step 611 increments the number of messages in the batch message queue. Step 612 checks whether the current number of messages in the batch message queue exceeds the maximum number of batch transactions. Step 613 checks whether the time since the beginning of message queuing in the batch message queue exceeds the maximum wait time. If either condition 612 or 613 is met, the sequence proceeds to step 615. The step 615 flags that the batch message queue has become full. Step 616 assembles a message to be stored in the system message reception queue. The assembling format is shown in FIG. 6. The format differs from ordinary transactions in that the number of batch processed transactions is appended at the end in place of transaction data. The format includes a message length 401, transaction name 402 and number of transactions 403. The space symbol at the end of the transaction name is used to extract the transaction name.

Step 617 sends the request of registration in the system message reception queue to the queue control section 8 by way of the transaction reception processing section 6 in FIG. 1. After the transaction has been registered in the system message reception queue by the above operation, it becomes a transaction under control of the data communication management system.

Step 614 records the current statuses of the batch message queue in the batch transaction table. After that, when a transaction to be batch processed is selected in the system message reception queue by the data communication management system, control is transferred to the application program control section 11a in the application program execution section 27. The application program control section determines and loads an application program and reserves resources necessary for the execution of the program. It also makes initialization so that the data base management system can run.

With regard to the application program, when the transaction name has been determined by the application program correspondence table in FIG. 7, the name of the application program to be executed is determined uniquely. In the figure, 404 is the column of transaction name and 405 is of application program name. The application program correspondence table is referred to by 13b in FIG. 1, while 13a is a data dictionary/directory file containing resources or resource names necessary for the execution of application programs. By use of the data dictionary/directory file, the application program control section 11a implements resource reservation. The processing of the application program control section is the application program starting process. Reference numeral 12a is the application program which has been loaded. Reference numerals 11b and 11c are batch receive section and batch send section of the message processing program, and 15 is a synchronous process request issued in the application program.

Figure 10:
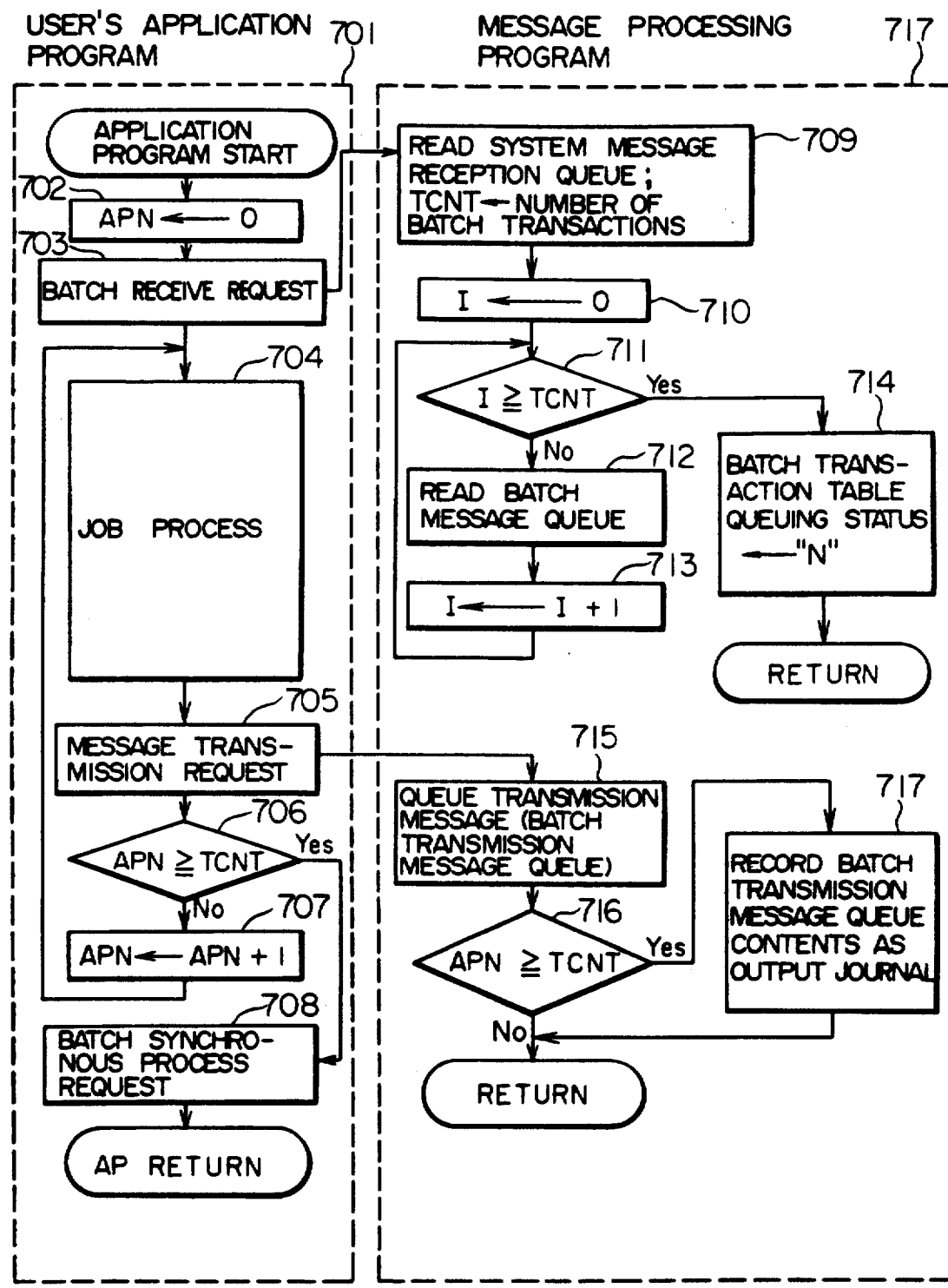
FIG. 10 is a diagram showing the execution of a user application program.

The operation related to the application program 12a, batch receive section 11b, the batch send section 11c of the message processing program, and the synchronous process request 15 will be described with reference to FIG. 10. Indicated by 701 is the application program and 717 is the message processing program. APN, which is loaded with φ in step 702 in the beginning of the application program, indicates the number of transactions processed by the application program. Step 703 is a request for retrieving a message from the batch message queue. In response to the issuance of the batch receive request, control is transferred to the batch receive section of the message processing program. The batch receive section first reads a message from the system message reception queue in step 709, and loads the number of batch transactions within the message into TCNT. Step 710 loads φ into I, which indicates the number of messages read out of the batch message queue. Step 711 tests whether the whole contents of batch message queue have been read out. The sequence proceeds to step 712 if the whole queue contents are found read, otherwise it proceeds to step 714. Step 712 reads one message in the batch message queue. Step 713 increments by one the number of messages which have been read before the current time. Step 714 sets "N" to the queuing status flag of the batch transaction table to indicate that the batch message queue has become empty. After that, the instruction next to the batch receive request is executed. Step 704 represents a job process, in which data base operation is implemented by use of the data base management system 12b. Upon termination of the job process, a transmission request for sending a transmission message to the terminal 1 is issued. Consequently, control is transferred to the batch send section. The batch send begins with step 715, in which the requested transmission message is queued in the batch transmission message queue 14. Step 716 responds to the message which has been queued last to record the contents of the batch transmission message queue as an output journal in step 717. Upon completion of these processings, control is transferred to the instruction next to the message transmission request 705. Step 708 issues a request of batch synchronous point process at the end of process for all transactions (step 706). Otherwise, the APN content is incremented by one (step 708) so that the next transaction is processed. When an ordinary transaction has been processed by the application program, a request for sending a transmission message to the terminal 1 is issued and the ordinary synchronous process request is made.

Next, the synchronous point processing section 28 will be described. In response to the issuance of the batch synchronous point process request, control is transferred to the batch synchronous point processing section 17. In the case of the synchronous point process request of an ordinary transaction, control is transferred to the ordinary transaction synchronous point process 16, in which one transaction synchronous point can be taken. At the synchronous point, the application program termination journal indicating the termination of the application program and the transaction termination journal indicating the completion of the whole transaction process are acquired. The acquired journal issues a journal acquisition request to the journal acquisition section 18, and thereby the acquired journals are written into the journal data set 19. The transmission message created by the application program is written into the system message waiting queue 20.

Figure 11:
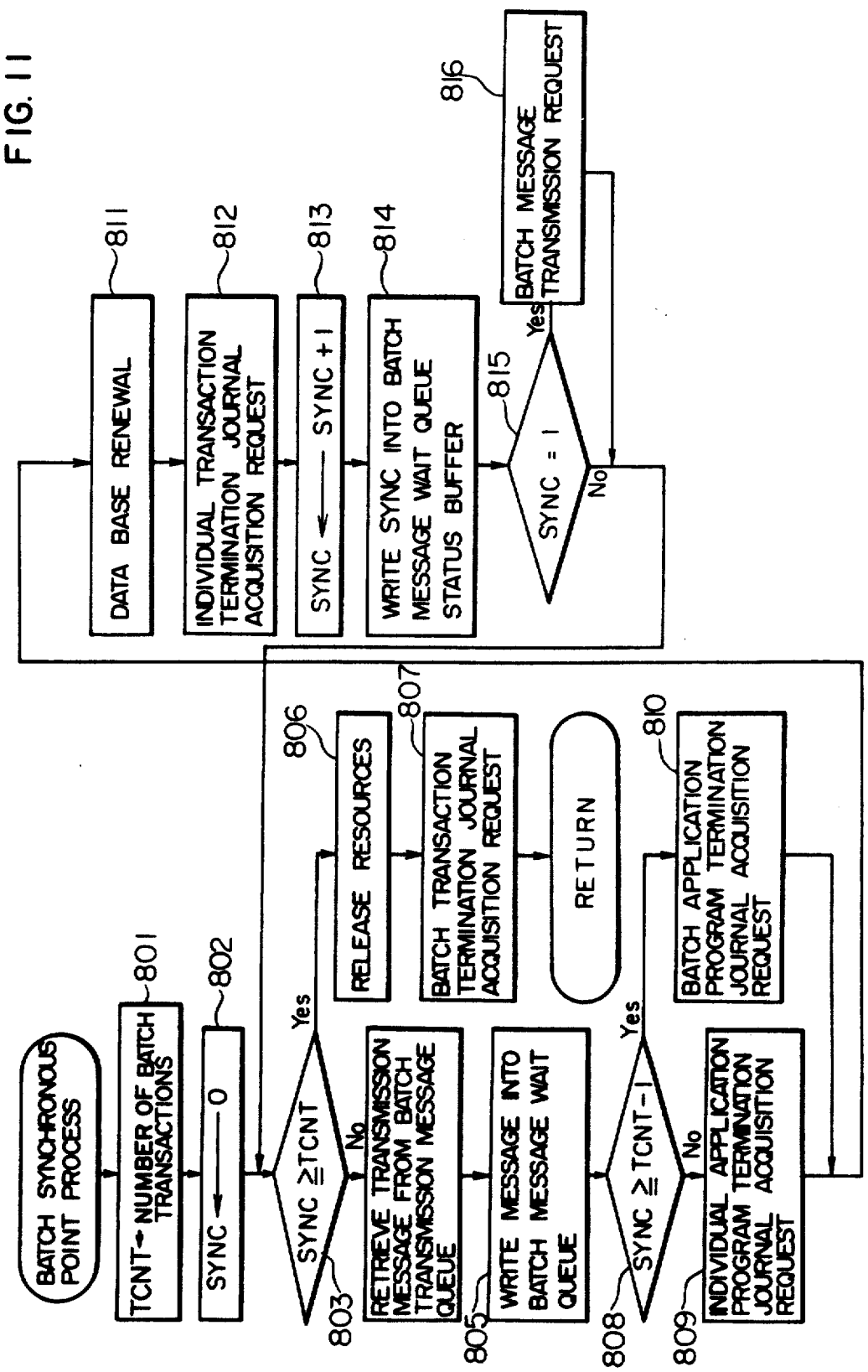
FIG. 11 is a flowchart of the batch synchronous point process.

In response to the issuance of the batch synchronous point process request by the application program, control is transferred to the batch synchronous point processing section 17, in which the process shown in FIG. 11 takes place as follows. Step 801 loads TCNT with the number of batch transactions from the batch transaction table, and step 802 loads φ into SYNC, which indicates the number of transactions that have been completed for the synchronous point process. Step 803 tests whether the synchronous point process for all transactions has completed. If the process is found incomplete, the sequence proceeds to step 804 for starting the synchronous point process for the next transaction. Otherwise the sequence proceeds to step 806.

Step 804 retrieves the transmission message, which has been stored by the batch send 11c, from the batch transmission message queue 14. Step 805 writes the retrieved message into the batch message wait queue 21. Step 808 tests whether the transmission message written in the batch message wait queue is the last one. If it is not the last message, an acquisition request of only the application program termination journal for the currently processed transaction is issued to the journal acquisition section. If, on the other hand, it is found to be the last message, an acquisition request of the batch application program termination journal is issued. The batch application program termination journal indicates that the application program termination journals for all transactions, as well as the application program termination journal for the last transaction have been acquired. This batch application program termination journal enables the recovery process at the occurrence of a fault to know the acquisition of application program termination journals for a plurality of transactions by making reference to only the batch application program termination journal. Therefore, fast recovery process can take place.

Step 811 updates the data base. Step 812 issues an acquisition request only for the transaction in the process of transaction termination journal. Step 813 updates the number of transactions which have completed the synchronous point process by incrementing the SYNC content by one. Step 814 writes the SYNC content into the batch message wait queue status buffer 22, which is used to make the batch synchronous point processing section synchronous with the message transmission section for the parallel operation with the batch message transmission section 23 in order to speed up the process. Step 815 detects the first-processed message to activate the batch message transmission section 23 (step 816). Upon completion of the synchronous point process for all transactions, step 806 releases the resources used by the application program. Step 807 issues an acquisition request of batch transaction termination journal, indicating that all transaction termination journals have been acquired, to the journal acquisition section. The batch transaction termination journal has the same meaning as the aforementioned batch application program termination journal.

Next, the message transmission section 29 will be described. In case of a transmission message of ordinary transaction, control is transferred to the message transmission processing section 24, which receives the message from the system message wait queue and issues a transmission request to the message editing-transmission section 25. After that, when the message transmission section 29 is informed from the communication control program 2 that the message transmission to the terminal has completed, it acquires the message transmission termination journal. In case a batch message transmission request is issued to the message transmission section 29, control is transferred to the batch message transmission section 23.

Figure 12:
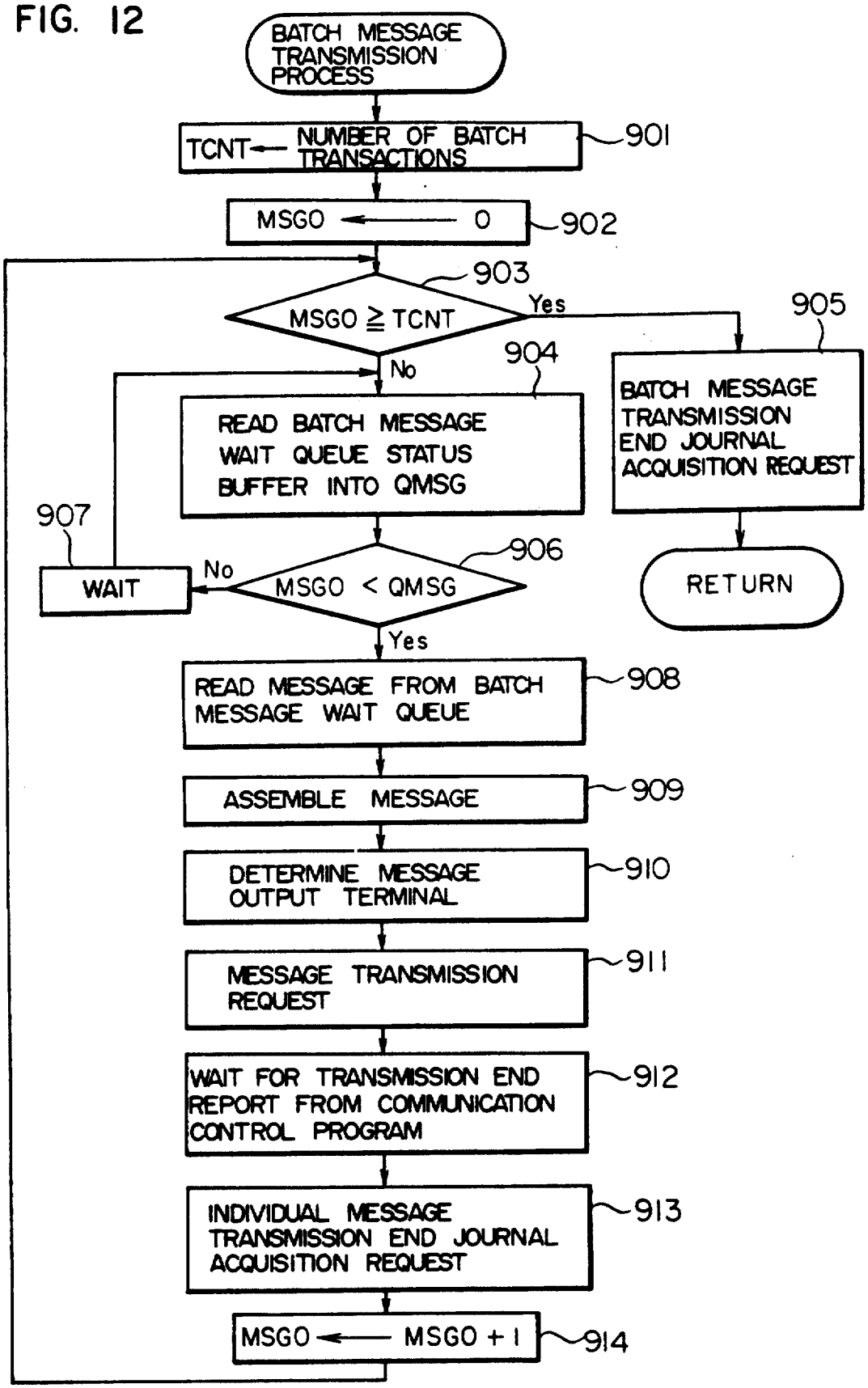
FIG. 12 is a flowchart of the batch message transmission process.

FIG. 12 shows the operation of the batch message transmission section 23. Step 901 loads TCNT with the number of batch transactions from the batch transaction table. Step 902 loads $\phi$ into MSGO indicating the number of transactions that have completed message transmission. Step 903 tests whether transmission messages of all transactions have been transmitted. If the completion of transmission is detected, the sequence proceeds to step 905. Otherwise, the sequence proceeds to step 904 which reads out the batch message wait queue status buffer into QMSG. Step 906 checks the batch message wait queue for the presence of messages which have not been transmitted and, if all messages are found transmitted, waits until the message from the batch synchronous point processing section 17 is queued (step 907). If a message which has not been transmitted is found, the sequence proceeds to step 908. The step 908 receives a message, which has not been transmitted, from the batch message wait queue. Step 909 assembles a transmission message so that it is fitted to the type of terminal, and determines a terminal to which the message is sent (step 910). Step 911 issues a transmission request to the message editing-transmission section 25 by way of the message transmission processing section 24. Consequently, the message editing-transmission section edits the message and transmits the edited message. Following the message transmission to the terminal, a transmission acknowledgement is returned from the communication control program to the batch message transmission section. Step 912 waits until the acknowledgement arrives. Step 913 issues an acquisition request of message transmission termination journal of the transaction, for which the message has been sent, to the journal acquisition section. Step 914 updates the number of transactions of the message which has completed transmission.

According to this embodiment, only a single session of process by the application program control section and only one synchronous point process request in an application program are required in processing a plurality of transactions. For journal acquisition, the number of file input/output operations can be reduced significantly by outputting to a journal file upon acquisition of the journal for the last transaction of a plurality of transactions. Consequently, the transaction process can take place at a high speed. In this embodiment, when a plurality of transactions are being processed, it seems as if one transaction is being processed when seen from the system, whereby the system maintenance activities are not changed significantly from the case of the conventional transaction system.

While a specific embodiment of the invention has been described, it is obvious to those skilled in the art that various changes and modifications can be made without departing from the present invention in its broadest aspects.

We claim:

1. A transaction processing method which implements transaction processing in a data communication management system in which a transaction causes an application program to start, said method comprising with an electronic apparatus executing the steps of:
   essentially determining whether a transaction is to be batch processed in accordance with a type of the application program required by said transaction;
   storing said transaction in a batch process transaction queue when said transaction is determined to be batch processed;
   starting an application program which electronically processes transactions stored in said batch process transaction queue when a predetermined condition is met, and upon termination of electronic processing of said application program, issuing once a synchronous point acquisition request for all processed transactions so as to acquire synchronous points of transactions in a batch fashion; and
   transmitting transmission messages of said processed transactions in a batch fashion, after batch acquisition of synchronous points for the transactions has been made.

2. A transaction processing method according to claim 1, wherein the determination as to whether a transaction is to be batch processed is based on a name of a transaction, said name corresponding to an application program which is to be executed for processing of said transaction.

3. A transaction processing method according to claim 1, wherein an application program for processing transactions stored in said queue is started in response to one of (i) a number of transactions stored in said queue exceeding a predetermined number and (ii) a predetermined time length elapsing since any of said transactions has been stored in said queue.

4. A transaction processing apparatus for a data communication management system in which a transaction causes an application program to start, said apparatus comprising:
   means for determining whether said transaction is to be batch processed in accordance with a type of an application program required by said transaction;
   a batch processing transaction queue for storing said transaction when said transaction is determined to be batch processed;
   means for executing application program for batch processing of said stored transaction, said application program executing means starting an application program for transactions stored in said batch process transaction queue when predetermined condition is met;
   means for executing synchronous point processing of transactions processed by said application program, said synchronous point executing means acquiring in a batch fashion synchronous points for the transactions processed by said application program in a batch fashion by a single synchronous point process request; and
   means for transmitting transmission messages of the transactions processed by said application program, said transmitting means outputting in a batch fashion transmission messages of transactions processed by said application program in a batch fashion.

5. A transaction processing apparatus according to claim 4, wherein the determination as to whether a transaction is to be batch processed is based on a name of a transaction, said name corresponding to an application program which is to be executed for processing of said transaction.

6. A transaction processing apparatus according to claim 4, wherein said application program for processing transactions stored in said queue is started in response to one of (i) a number of transactions stored in said queue exceeding a predetermined number and (ii) a predetermined time length elapsing since any transaction has been stored in said queue.

7. In a data communication management computer system, a method of electronic transaction processing, the method comprising with the computer system electronically forming the steps of:
  electronically receiving each of a plurality of electronic transactions;
  determining whether each received transaction is to be batch processed;
  storing each transaction which is to be batch processed in a batch process queue;
  in response to one of (i) a number of transactions stored in the queue exceeding a predetermined number and (ii) a predetermined length of time elapsing since receipt of a most recently received transaction, withdrawing transactions which are to be processed by a common applications program from the queue and electronically processing the withdrawn transaction to generate electronic message; and,
  electronically transmitting the messages concurrently to user terminals.

8. The method as set forth in claim 1 wherein the determining step includes comparing a name associated with each transaction with preselected names.

9. A communication management computer system for batch processing received transactions, the system comprising:
  a determining means for determining whether each of a plurality of received transactions is to be batch processed by a corresponding one of a plurality of batch processing application programs;
  a queue means for receiving and storing the transactions which are to be batch processed;
  a program executing means which receives from the queue means transactions corresponding to a common applications program for batch processing the received transactions by the common applications program to generate messages; and,
  means for transmitting the messages generated by the program executing means to a plurality of terminals.

10. The system as set forth in claim 9 wherein each transaction includes a name indicative of its corresponding application program and wherein the determining means includes a comparing means for comparing each name with preselected names.

11. The system as set forth in claim 9 further including a starting means for starting the executing means, the starting means including means including at least one of a means for comparing a number of transactions stored in the queue means with a preselected number and a means for comparing a duration since receipt of a most recently received transaction with a predetermine duration.

12. A transaction processing method executed by a data communication management system, said method comprising the steps of:
  electronically determining whether each of a plurality of received transactions is to be batch processed in accordance with a type of the application program required by each transaction;
  storing each batch process transaction in a batch process transaction queue of the data communication management system;
  concurrently batch processing the transactions stored in said batch process transaction queue that correspond to a common application program to generate processed transaction messages;
  issuing a synchronous point acquisition request for all processed transactions messages upon termination of said common application program;
  electronically transmitting said processed transactions messages to terminals in a batch fashion.

13. A data communication management system for processing transactions, the system comprising:
  a determining means for electronically determining whether each of a plurality of transactions is to be batch processed in accordance with a type of application program required by each transaction;
  a queue means for storing said transactions to be batch processed;
  a program executing means for executing a selected application program which batch processes the transactions stored in said queue that require the selected application program to transaction messages;
  a synchronous point means for making a single synchronous point process request which acquires in a batch fashion at least the transaction messages from said program executing means; and,
  a transmitting means for electronically transmitting to terminals messages which the program executing process from the process transactions in a batch fashion.

* * * * *